(12) United States Patent
Katcher et al.

(10) Patent No.: US 6,177,748 B1
(45) Date of Patent: Jan. 23, 2001

(54) INTERLEAVED LAMINATED CORE FOR ELECTROMAGNETIC MACHINE

(75) Inventors: Thomas E. Katcher, Euclid; Thomas G. Rodano, Garfield Heights, both of OH (US)

(73) Assignee: Reliance Electronics Technologies, LLC, Thousand Oaks, CA (US)

( * ) Notice: Under 35 U.S.C. 154(b), the term of this patent shall be extended for 0 days.

(21) Appl. No.: 09/059,482

(22) Filed: Apr. 13, 1998

(51) Int. Cl.[7] .......................... H02K 21/48; H02K 21/14
(52) U.S. Cl. .......................... 310/209; 310/217; 310/191
(58) Field of Search ...................... 310/43–45, 209, 310/179, 193, 211, 191, 216, 217, 254, 258, 259, 261, 264, 265; 29/596, 598; 174/117 F, 120 R, 117 FF

(56) References Cited

U.S. PATENT DOCUMENTS

| | | | |
|---|---|---|---|
| 5,306,989 | * | 4/1994 | Feller, Jr. .......................... 318/372 |
| 5,619,956 | * | 4/1997 | Koziara et al. .................. 123/41.31 |

* cited by examiner

*Primary Examiner*—Tran Nguyen
(74) *Attorney, Agent, or Firm*—Michael A. Jaskolski; John J. Horn; William R. Walburn

(57) ABSTRACT

A core configuration for use with an electromagnetic machine including first and second pluralities of laminations, each of the first and second pluralities having different properties and/or operating characteristics, the first and second pluralities interleaved together to form a core having desired core properties which are a combination of the properties of the first and second pluralities.

1 Claim, 4 Drawing Sheets

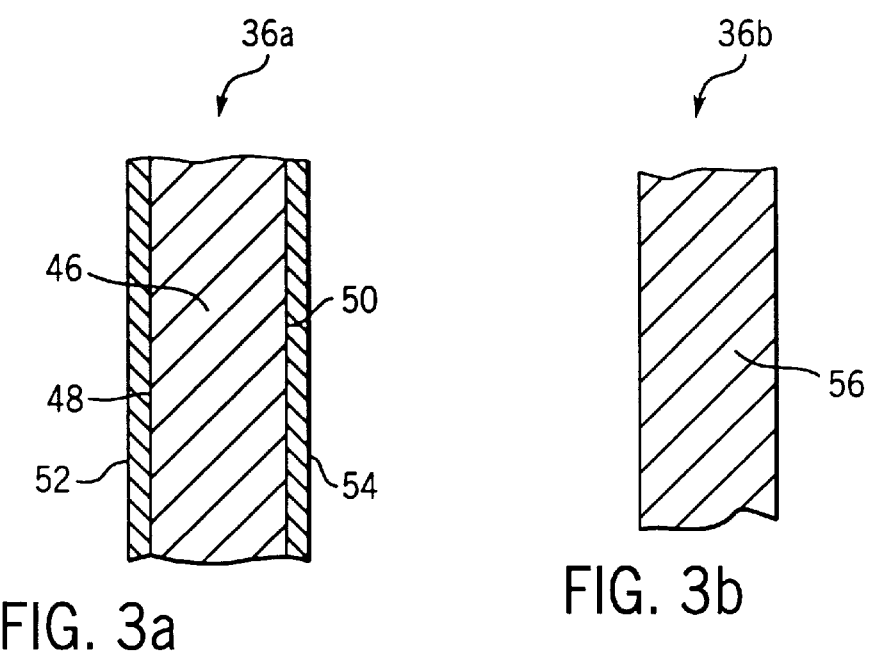
FIG. 2
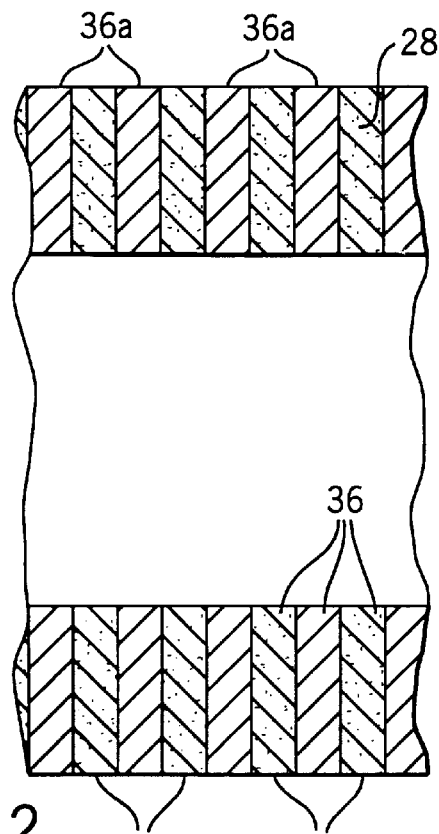
FIG. 3a
FIG. 3b

INTERLEAVED LAMINATED CORE FOR ELECTROMAGNETIC MACHINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to laminated stator and rotor cores for use with electromagnetic machines and more particularly to core configurations including laminations which have disparate physical properties and operational characteristics.

One common motor type is an induction motor. All induction motors include a stator assembly and a rotor assembly. A typical stator assembly includes a stator core which forms a stator cavity and a plurality of stator windings wrapped around the core such that when current passes through the windings, the current creates an electromagnetic field inside the cavity. In addition to providing support to the windings, the core serves as a flux path for stator field flux and hence strengthens the field within the cavity. By varying the stator currents the magnetic field within the cavity is caused to rotate about the cavity.

A typical rotor assembly includes a rotor core and a plurality of rotor bars (e.g. aluminum bars) which are shorted together at their ends by two shorting rings (e.g. aluminum rings) to form a "squirrel cage" around the core, the core and bars configured so as to fit within the stator cavity. The bars and ring are typically radially constrained by rotor tooth tips or rotor slot bridge formed by the rotor core. The rotor is mounted on a shaft for rotation within the cavity, the rotor and stator together forming an air gap. The rotor bars are arranged such that when the stator magnetic field rotates about the stator cavity, the varying field within the cavity induces rotor current within the bars. The rotor current in turn causes a rotor magnetic field within the stator cavity. The stator and rotor fields interact such that, as the stator field rotates about the core, the rotor field is drawn in the same direction and the rotor rotates within the cavity about the axis of the shaft. In addition to providing support for the bars, the rotor core operates as a flux guide for rotor magnetic field flux.

Motors are typically designed with an end use in mind and therefore, each motor must be able to achieve certain minimal operating characteristics within a specific budget. For example, a motor must be able to generate at least a certain minimal amount of torque, drive at least a minimal load and achieve at least a minimal rotational velocity. To this end, core structures are typically designed such that they have at least certain minimal operating characteristics and a specific cost which can be relied upon when configuring other motor components.

In addition to cost, perhaps the two most basic design criteria for cores are size and efficiency, efficiency being the amount of flux which can be generated within a core given a specific field strength. While high efficiency is desirable, size should be minimized.

There are two primary core characteristics which affect efficiency: core permeability and core losses. The permeability of a substance is the quotient of a change in magnetic induction divided by the corresponding change in magnetizing force. For example, when a magnetic field having a specific strength induces a relatively large amount of flux within a substance, the substance is said to have a high permeability. When a field induces a relatively small amount of flux within a substance, the substance is said to have a low permeability.

The term core losses is used to refer collectively to two different types of energy loss which are generally referred to as eddy current and hysteresis losses. Hysteresis losses are caused by the reality that it takes some energy to change the magnetic state of a substance. For example, when a magnetic substance is placed within a magnetic field, field energy in the form of flux is guided through the substance. A first portion of field energy is stored and is wholly recoverable from the substance when the substance is removed from the field. A second portion of field energy is converted to heat as a result of work required to magnetize the substance and begin flux flow. Hysteresis losses comprise this second portion of field energy.

Eddy current losses result from an electric field and consequent circulatory currents induced in a core by time varying fluxes. Whenever magnetic flux within a substance changes, an electric field is generated within the substance. When the substance is conductive, the electric field causes currents within the substance which are referred to as eddy currents. Eddy currents cause substance heating and subsequent eddy current losses which are proportional to the square of the eddy current multiplied by the substance resistance.

One common core type is a core formed of powdered iron material. To form this type of core, powdered iron material is fed into a mold, compressed under extremely high pressure and then sintered or resin bonded into a finished "compact". The sintering or resin bonding processes hold the material in the compact form. There are many advantages to powdered iron cores including minimum wasted core material and extremely high magnetic permeability. In addition, resin bonded compacts generate minimal eddy current losses. Moreover, sintering can hold powdered iron in a small core configuration.

Unfortunately, compacting force within the powdered material drops off dramatically with distance from the compacting surface, resulting in lower effective density within the core. This is especially true of resin bonded compacts. Generally, as the effective density of a core decreases the relative size of the core increases. In addition, loosely packed cores have minimal mechanical strength. Moreover, while sintered compacts are relatively small, sintered compacts generate excessive eddy current losses.

Another common core type which overcomes some of the shortcomings of the powdered iron core is a laminated core. A laminated core is formed by stacking a plurality of electrical steel laminations together along the length of the core, each lamination being a flat member having oppositely facing first and second surfaces, each surface having the general shape and area of a transaxial slice of the core. An electrically insulating core plating layer is provided on each of the first and second surfaces of each lamination. When stacked together, core plating provides an electrical barrier between adjacent laminations without impeding magnetic flux within the core. While eddy currents still exist within each lamination, the electrical barriers impede greater eddy currents from flowing throughout the core.

Because different materials have different permeabilities and different hysteresis loss characteristics, the easiest way to increase permeability and decrease hysteresis losses in a laminated core and thereby enhance core efficiency is to choose substances for forming laminations which are known to have a high permeability and low hysteresis losses. Similarly, eddy current losses can also be further minimized by choosing laminate substances having characteristically low eddy current losses. As a starting point, usually core materials are limited to metals which are generally permeable and have relatively low losses. Core materials are also usually doped with a loss inhibitor such as silicon to minimize core losses.

To enhance permeability and reduce losses even further, virtually all substances used to form laminations are subjected to various processes including at least one annealing process which is performed either by the material manufacturer or the core manufacturer. During an annealing process a sheet of metallic substance is held at an elevated temperature for the duration of a specified period in order that metastable high permeability and low loss characteristics go into thermal dynamic equilibrium. After the specified period, the substance is cooled slowly back to room temperature, the metastable conditions becoming permanent characteristics of the substance. The metallic sheet or coil may be coated with core plate material as a coil or sheet or the individual laminations may be coated after the laminations have been stamped from the sheet or coil. Depending upon the properties of the metallic substance and the machine manufacturer's processes the laminations may or may not be given a final anneal before assembly to form the electrical machine cores.

Even where an annealing process is precisely controlled, resulting substance permeability and losses cannot be precisely determined until after annealing. This is because initial substance characteristics, even for a specific grade of substance, are not always the same and disparate initial characteristics are reflected in the annealed substance. In addition, even where two substances have similar initial characteristics, the annealing process can affect the substances differently. For this reason, instead of annealing to generate substances with precise characteristics, it is common practice within the industry to anneal with a target range of substance characteristics as a goal, the target range defined by a minimal acceptable permeability and maximum acceptable core losses. After annealing, the substance characteristics are determined using substance samples which are annealed along with the lamination material. The samples are tested (e.g. according to an Epstein test as well known in the art) after annealing by industry prescribed procedures for permeability and losses to ensure that substance characteristics at least meet the minimum requirements of the target range. Other motor components are then designed in light of the minimum substance requirements to provide the minimal required motor operating characteristics.

Unfortunately, while conventional laminated cores as described above overcome some of the problems associated with powdered iron cores, they too have several shortcomings. For example, because laminations are stamped out of sheet material, some lamination scrap is generated and wasted. In addition, because annealed lamination material has disparate characteristics, designers have to configure cores for worst case conditions including minimum allowable permeability and maximum allowable core loss. This constraint causes inefficiencies. For example, some finished laminations might not meet the minimum core loss and permeability requirements and therefore might have to be scrapped. Other lamination material might far exceed the minimum core loss and permeability requirements and thus provide excessive core capability. Moreover, core plated laminations are relatively expensive and therefore increase motor cost.

Furthermore, in many motors, the primary path for dissipating core heat is thermal conductivity through the back iron of the motor stator. While silicon and similar materials reduce core losses, silicon decreases thermal conductivity thereby "bottling up" heat within the core which reduces rated motor output and can require more expensive insulation or a separate heat dissipating mechanism, both options increasing motor costs considerably.

Moreover, for high speed motors, the rotor often has massive structures (e.g. rotor bars or windings in other types of electromotive machines) which are constrained radially solely by the rotor tooth tips or slot bridges. Unfortunately, annealing and other material processing which results in good electrical performance of steel laminates typically lessen laminate mechanical strength.

In addition, some motors require specially designed and relatively expensive cores to enable the motors to operate in special applications. One special application requires a strong axial force which can move a rotor axially within a stator cavity from a first position into a second position. For example, electric hoist motors often require axial rotor movement. One common electrical hoist motor designed to facilitate axial rotor movement includes a rotor and a stator which together define a conical air gap, the stator cavity narrower at a first end than at a second end, the rotor including first and second ends, the second end wider than the first end. A conical brake drum is provided at the second end of the stator cavity and a similarly shaped brake shoe is affixed to the rotor shaft between the second rotor end and the drum. An axial coil spring at the first rotor end biases the rotor and shaft out of the stator into a first position wherein the shoe is received in the drum thereby impeding rotor rotation. When the motor is energized, a strong axial force is formed in the air gap due to the conical geometry of the gap. This force compresses the axial coil spring thereby releasing the brake, moving the rotor into a second position within the stator and allowing rotor rotation. When power is removed, the spring decompresses and the rotor is forced once again into the first position with the brake impeding rotor rotation. This type of conical core design is expensive. This is because a large number of dies are required to stamp out laminations for forming conical cores which in turn form the conical air gap.

For all of these reasons, it would be advantageous to have versatile core "building blocks" which could be combined to form a core structure having selected core characteristics including permeability, core loss, mechanical strength and heat dissipation and which could be formed inexpensively.

BRIEF SUMMARY OF THE INVENTION

The present invention includes several different core constructs which allow a designer to configure a core having desired core characteristics. To this end, each construct includes at least two different pluralities of laminates having different laminate characteristics which can be interleaved to form a core having core characteristics which reflect the characteristics of the combined laminates.

One object of the invention is to reduce the cost associated with providing core plating between adjacent core laminates. According to one embodiment of the invention, instead of core plating both oppositely facing sides of each laminate in a core, only every other lamination is core plated. Thus, a first plurality of laminations includes core plating on first and second oppositely facing sides while a second plurality of laminations is not core plated at all. This configuration reduces the costs of core plating by half and still provides an electrical barrier between adjacent laminates for reducing core losses generally.

Another object of the invention is to reduce overall core costs by forming a core using two pluralities of laminates, a first plurality including powdered iron laminates and a second plurality formed by stamping laminates from steel sheet material. Because the powdered laminates are axially extremely thin, they can be compressed such that they are extremely dense and thus require relatively minimal volume. The second plurality of stamped electrical steel laminations are formed so as to have the same geometric shape and area as the first plurality. Preferably, both sides of the each steel laminate are core plated. The first and second pluralities of laminates are then interleaved to form the core. The powdered iron laminates provide extremely high permeability, the stamped laminates provide mechanical strength to the assembly and the core plating impedes eddy currents and hence minimizes core losses.

One other object of the invention is to provide a mechanically strong core configuration including steel laminates which have good electromagnetic characteristics. According to yet another embodiment of the invention, a first plurality of steel laminates which have been processed to have good electromagnetic characteristics but which have relatively poor mechanical strength is interleaved with a second plurality of steel laminates which have high mechanical strength. Core plating can be provided on each or every other laminate. The number of laminates in the first plurality with respect to the number in the second plurality can be modified to provide whatever core strength is required. For example, there might be one strength laminate for every half inch of core length or there might be one strength laminate for every two inches of core length. The first plurality generate high flux while the second plurality provide mechanical strength.

One other object of the invention is to provide a core which is inexpensive to manufacture but which can facilitate axial rotor movement between first and second positions. To this end, instead of providing a conical air gap, a cylindrical air gap is formed by the stator and rotor assemblies. To facilitate axial movement, the rotor core includes a first plurality of magnetic laminates interleaved with a second plurality of nonmagnetic laminates wherein the geometric shape and area of each laminate is identical. Similarly, the stator core is also formed of a first plurality of magnetic laminates and which are interleaved with a second plurality of nonmagnetic laminates wherein the geometric shape of the each laminate in the third and fourth pluralities is identical.

This embodiment is particularly useful in constructing an electric hoist motor including an axially compressible spring which biases the rotor into a first position wherein the rotor is forced at least partially out of the stator, a brake shoe at the first end of the rotor received within a brake drum for impeding rotor movement. In the first position, the steel laminates in the rotor core are misaligned with the steel laminates in the stator core. When power is supplied to the stator, the rotor core is forced against the force of the spring into a second position wherein the brake is disengaged and the steel laminates of the rotor and stator cores are aligned. The axial force created within the cylindrical air gap is proportional to the total length of steel rotor laminations which are axially misaligned with steel stator laminations.

Yet another object of the invention is to facilitate flexible core manufacturing wherein a core designer can specify core characteristics required for a specific motor configuration instead of designing a motor to accommodate minimum core requirements. To this end, the present invention includes a core wherein laminates may be of two or more different pluralities wherein each of the separate pluralities has different characteristics and the core has core characteristics which are a combination of the different laminate characteristics. For example, where one plurality of laminates has low permeability and high core loss and a second plurality of laminates has high permeability and low core loss, the two pluralities can be interleaved to provide a core with average permeability and average core loss. Any combination of laminates can be configured to achieve any desired core characteristics. In addition to facilitating flexible core manufacturing, this embodiment also reduces laminate scrap. Even laminates having extremely poor permeability and high core loss can be combined with other laminates having low losses and high permeability so that the poorer quality laminates do not have to be scrapped.

Another object of the invention is to provide a core with good heat dissipation characteristics and low core losses. To this end, a first plurality of laminates which has good heat dissipation characteristics and high losses can be interleaved with a second plurality of laminates which has poor heat characteristics but low core loss to provide a cost effective thermally efficient design.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 2 is a cross-sectional view of a portion of the rotor laminates of FIG. 1;

FIG. 3a is a cross-sectional view of a portion of a single laminate from a first plurality of laminates while FIG. 3b is a cross-sectional view of a portion of a single laminate from a second plurality of laminates according to a first embodiment of the invention;

FIG. 5a is a cross-sectional view of rotor and stator laminates of FIG. 4 in a first position while

DETAILED DESCRIPTION OF THE INVENTION

A. General Motor Hardware

Figure 1:
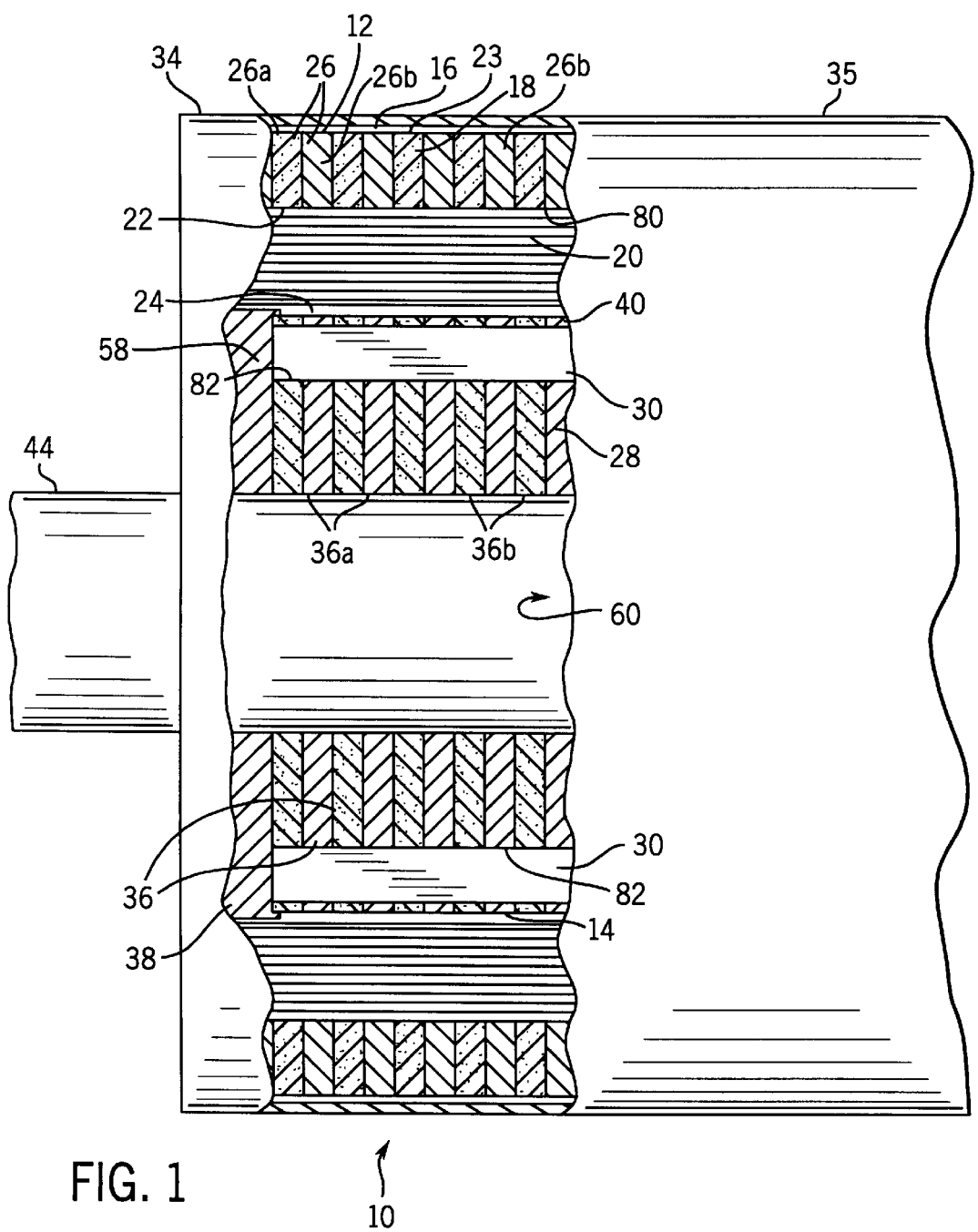
FIG. 1 is a cross-sectional view of an induction motor including interleaved first and second pluralities of rotor laminates and interleaved first and second pluralities of stator laminates.

Referring now to the drawings wherein like reference numerals and characters represent corresponding elements throughout the views, and more specifically, referring to FIG. 1, the present invention will be described in the context of an induction motor 10 which generally includes a stator assembly 12 and a rotor assembly 14. Stator assembly 12 includes, among other things, a cylindrical stator housing 16, a stator core generally indicated by numeral 18 and a stator winding 20.

Figure 6:
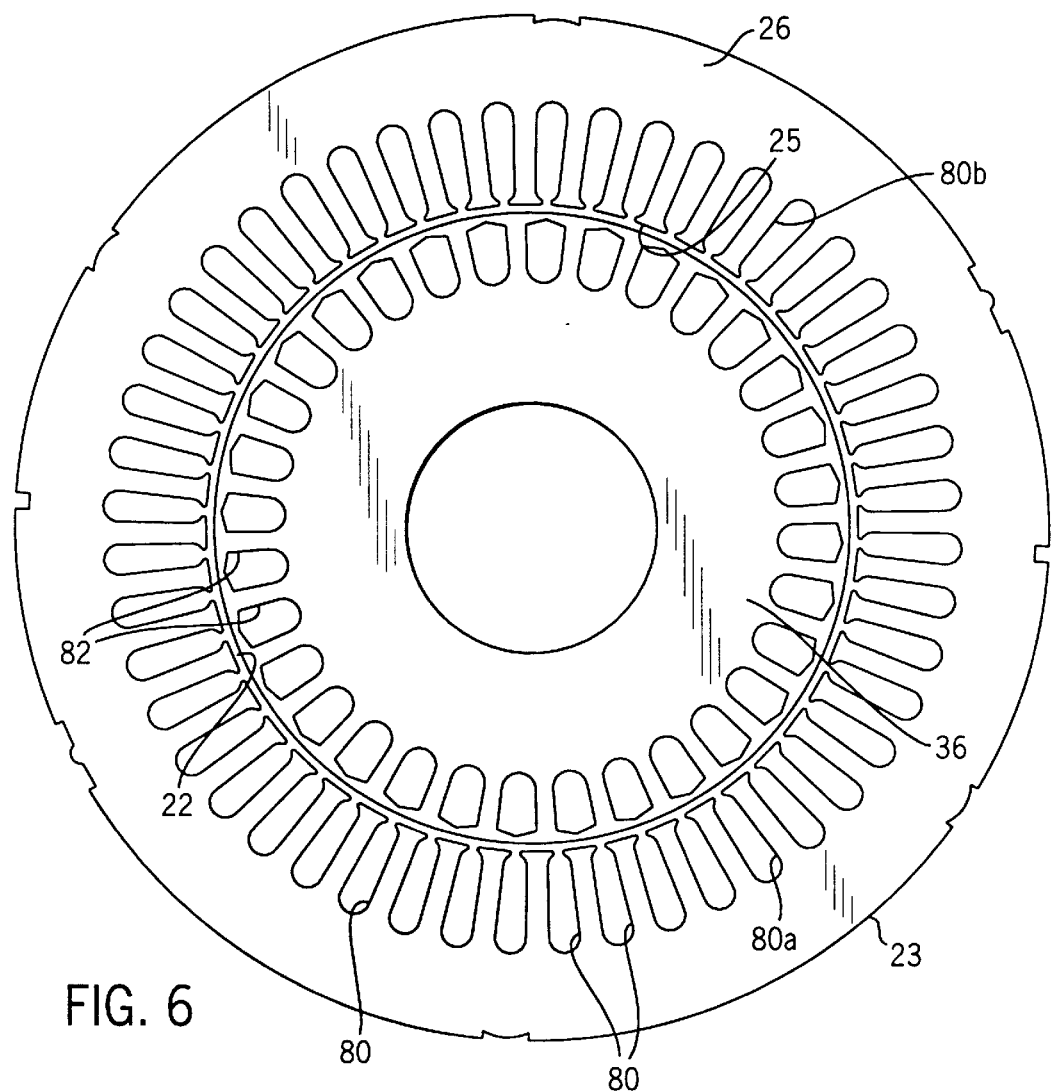
FIG. 6 is a plan view of exemplary rotor and stator laminates.

Referring also to FIG. 6, stator core 18 is formed by a plurality of stator laminates 26. All laminates 26 have essentially identical geometric shape, each laminate 26 forming a ring having a centrally located opening 25 and also forming a plurality of winding slots 80 which open radially inwardly. As will be explained in more detail below, each laminate 26 can be formed of any of several different materials, the type of material used to form each laminate 26 affecting overall operation of stator core 18 which is mounted inside housing 16. Laminates 26 are stacked together with slots 80 aligned to form core 18. When stacked together, laminates 26 form a core internal surface 22 and an external surface 23. As generally indicated by numerals 34 and 35, stator assembly 12 and core 18 have first and second ends 34, 35, respectively.

Stator windings 20 are wrapped tightly around core 18 passing from first end 34 through one of slots (for example, slot 80a in FIG. 6) to second end 35, looping around second end 35 through a different slot (for example, slot 80b) which is geometrically identical to slot 80a but is located at a different tangential location with respect to the stator cavity, back to first end 34, around first end 34 and back through slot 80a. Several windings 20 are typically provided. Core 18 and windings 20 together form stator cavity 24. Although not illustrated, first and second ball bearing assemblies are mounted within centrally located apertures in first and second ends 34, 35, respectively.

Rotor assembly 14 includes, among other things, a rotor core generally indicated by numeral 28, a plurality of rotor bars 30 and a rotor shaft 44. Rotor core 28 is formed by a plurality of rotor laminates collectively referred to by numeral 36. Referring also to FIG. 6, each laminate 36 is a flat member which is essentially doughnut shaped having a number of holes 82 arranged around the outer periphery of the laminate. All laminates 36 have essentially identical geometric shapes. Laminates 36 are stacked together to form rotor core 28 with holes 82 aligned and which, like stator core 18, has first and second ends generally referred to by numerals 58 and 60, respectively. First end ring 38 is positioned at first end 58 of core 28 while the second end ring which is not illustrated is similarly positioned at second end 60 of core 28. Each end ring 38 is firmly attached to bars 30 which pass through holes 82 on the periphery of each laminate 36. Shaft 44 is securely and integrally linked to core 28 in any manner well known in the art.

Rotor assembly 14 is mounted within stator core cavity 24 so that core 28 is concentrically aligned with core 18 and first and second ends 58, 60 are supported by the first and second ball bearing assemblies (not illustrated). Thus, rotor assembly 14 is essentially free to rotate within cavity 24.

In operation, when a variable current is provided to stator windings 20, the current generates an electromagnetic field around windings 20. Stator core 18 serves as a conduit for the magnetic field and helps concentrate the field within core cavity 24. The field within cavity 24 in turn induces (hence the term induction motor) a current within rotor bars 30. The current within bars 30 generates a rotor magnetic field within cavity 24. Rotor core 28 serves as a conduit for the rotor magnetic field. By controlling the stator current through windings 20 such that the resulting stator magnetic field rotates about cavity 24, the rotor magnetic field can be caused to similarly rotate about cavity 24. As the stator and rotor magnetic fields interact and attract, the force caused by the attraction tends to drag rotor assembly 14 along, thereby rotating assembly 14, including shaft 44 about a rotation axis within cavity 24.

As explained in detail above, many factors must be considered when designing stator and rotor cores 18, 28, respectively. In particular, the permeability, core losses, thermal conductivity, mechanical strength and cost of laminate and core production must all be considered. To this end, the present invention includes a plurality of different core constructions which can be used to enhance core characteristics for specific applications and to generally enhance core characteristics.

Referring still to FIG. 1, according to the teachings of the present invention, each of cores 18 and 28 could be constructed in any of several different manners to enhance core characteristics. Teachings with respect to rotor core 28 are generally applicable to stator core 18 and vice versa. Therefore, in the interest of simplifying this explanation, unless there is a special synergy between stator and rotor cores 18, 28, respectively, the present invention will be described only with respect to rotor core 28, the teachings easily applicable to stator core 18 by one of ordinary skill in the art. To this end, FIG. 2 is an enlarged cross sectional view of a portion of rotor core 28.

B. Core Configurations

1. Interleaved Coated Laminates

Referring to FIG. 2, according to a first embodiment of the present invention, rotor laminates 36 includes two separate pluralities of laminates including a first plurality 36a and a second plurality 36b, each of the first and second pluralities 36a and 36b having unique characteristics. Specifically, referring also to FIGS. 3a and 3b, each of laminates 36a includes a steel member 46 having first and second surfaces 48, 50, respectively, and first and second core plate coatings 52, 54, respectively on first and second surfaces 48, 50, respectively, while each of laminates 36b simply includes a steel member 56. When core 28 is constructed, laminates 36a and 36b are interleaved such that every other laminate 36 is from the first plurality 36a and every other laminate is from the second plurality 36b.

As well known in the industry, it is more expensive to provide a core plated laminate such as the laminates of plurality 36a than it is to provide a non-core plated laminate such as the laminates in plurality 36b. However, there must be an electrical insulator such as core plate coatings 52 and 54 between adjacent laminates within a core. It has been recognized that instead of core plating each of laminates 36, only half of the laminates 36 have to be coated to provide core plating between adjacent laminates. Thus, this embodiment of the present invention provides a relatively inexpensive core configuration without allowing interlaminar current flow. Machine performance is not affected.

2. Interleaved Laminates for Mechanical Strength a. Powdered Iron Compact Laminates Referring again to FIG. 2, according to the second embodiment of the present invention laminates 36 again include a first and second pluralities of laminates 36a and 36b, respectively. First plurality 36a is formed of stamped electrical steel as in the first embodiment. However, according to this second embodiment, each of laminates 36b includes a separate powered iron compact which is formed as to have the same planar geometric shape as each of laminates 36a though not necessarily the same axial thickness. Each of compacts 36*b* can have extremely high density as each is extremely thin and compact pressure thereon can be extremely high. If desired, each of laminates 36*a* can be core plated to reduce interlaminar current flow. To form the core, laminates 36*a* and 36*b* are interleaved as illustrated. The powered iron laminates 36*b* provide extremely high magnetic permeability and the stamped laminates 36*a* provide mechanical strength to the assembly.

b. Steel laminates

Referring again to FIG. 1, for high speed electrical machines rotor bars 30 are often massive structures which are often constrained radially solely by rotor tooth tips 40. Unfortunately, material processing which results in good electrical magnetic performance of the electrical steel laminations typically produces fairly low mechanical strength in the materials.

To provide mechanical strength and yet still achieve good electromagnetic performance, referring again to FIG. 2, according to a third embodiment of the present invention, laminates 36 again include first and second pluralities of laminates 36*a* and 36*b*, respectively. Laminates 36*a* include electrical steel laminates processed to provide extremely good electromagnetic performance, but which have fairly low mechanical strength. Each of laminates 36*b* is formed so as to have the same planar geometric shape and cross-sectional area as each of laminates 36*a*, but is formed of a material which is relatively stronger and which is characterized by reduced electromagnetic performance. For example, each laminate 36*b* may be a steel laminate which is not processed in the same manner as laminates 36*a* and, therefore, retains its mechanical strength but has less favorable electromagnetic performance.

3. Interleaved Magnetic/Nonmagnetic Laminates

Referring again to FIG. 2, according to a fourth embodiment of the present invention, core laminates 36 include first and second pluralities of laminates 36*a* and 36*b*, respectively. Each laminate 36*a* in the first plurality is formed of a magnetic material (i.e., electrical steel) while each laminate 36*b* of the second plurality is formed of a nonmagnetic material (i.e., the material having a magnetic permeability which is substantially less than the magnetic material used to form laminates 36*a*). For example, each of laminates 36*b* might be formed of a fiberglass material having a permeability less than 5% of the material used to form laminates 36*a*.

The objective of this construction is to create a strong axial force within an electrical machine without the need for a conical air gap. For example, referring to FIG. 4, an electric hoist motor assembly 62 according to this fourth embodiment is illustrated. Assembly 62 includes a stator core 18, a rotor core 28, a rotor shaft 44, a stop 64, a spring 66, a conical brake drum 68, and a conical brake shoe 70. Rotor core 28 is mounted within stator core 18 for rotation about a rotation axis. Shaft 44 is integrally attached to and extends from core 28. Brake shoe 70 is integrally attached to a distal end of shaft 44 opposite rotor core 28. Shoe 70 is formed so as to be receivable within drum 68, when received therein, drum 68 impeding shoe 70 rotation and thereby impeding shaft 44 and rotor core 28 rotation.

Spring 66 is positioned between rotor core 28 and stop 64 and biases rotor core 28 toward a first braking position wherein shoe 70 is received within drum 68. Thus, core 28 is mounted within stator core 18 such that core 28 can move axially as indicated by arrow 72. Core 28 can be forced into a second position as illustrated and against the force of spring 66 such that rotor and stator cores 28,18, respectively, are aligned and shoe 70 is removed from drum 68. Thus, when in the first position, drum 68 and shoe 70 cooperate to impede rotor motion. However, when in the second position with shoe 70 removed from drum 68, rotor core 28 is free to move within stator core 18.

Figure 4:
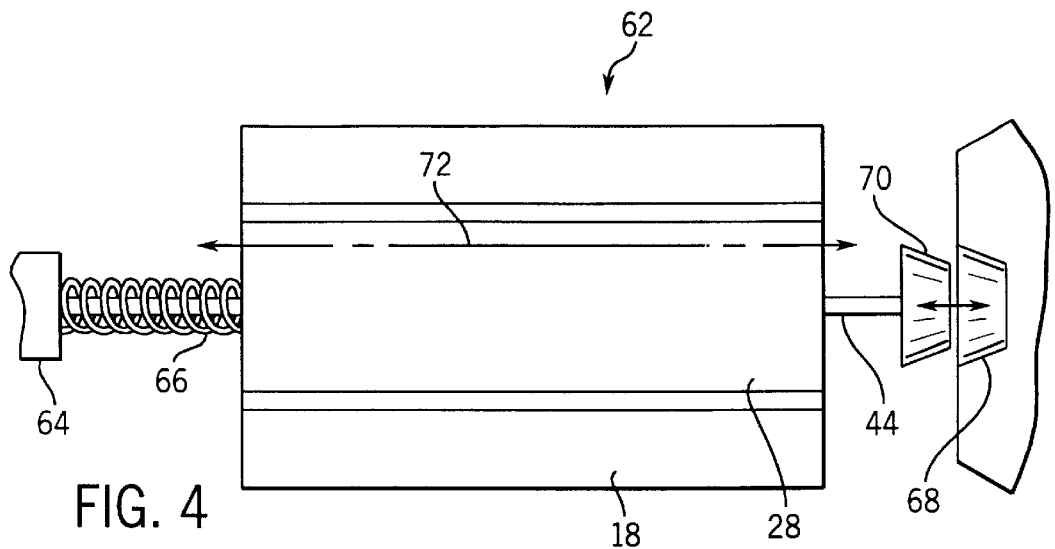
FIG. 4 is a schematic view of an electric hoist motor according to the present invention.
Figure 5A:
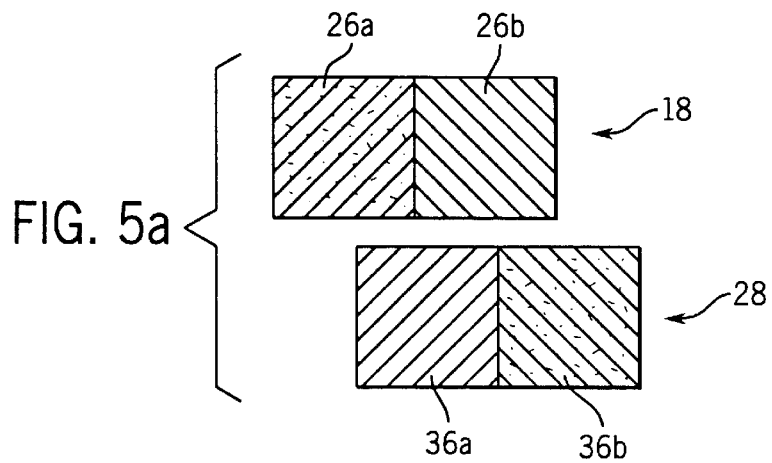

Referring to FIGS. 4 and 5*a*, a portion of stator core 18 including a stator laminate from a first plurality of laminates 26*a* and a stator laminate from a second plurality of stator laminates 26*b* and a portion of rotor core 28 including a single rotor laminate from a first plurality 36*a* and a single rotor laminate from a second plurality of laminates 36*b* is illustrated. Herein, laminate 26*a* is formed of a magnetic material whereas laminate 26*b* is formed of a nonmagnetic material. Similarly, laminate 36*a* is formed of a magnetic material whereas laminate 36*b* is formed of nonmagnetic material. Cores 18 and 28 in FIG. 5*a* correspond to the case wherein core 28 is in the first breaking position with shoe 70 received within drum 68. Referring also to FIG. 1, when no current is provided to stator windings 20, there is no interaction between the stator and rotor cores 18, 28, respectively and therefore magnetic laminates 26*a* and 36*a* do not attract and spring 66 forces rotor core 28 into the first position where drum 68 and shoe 70 impede rotor core 28 rotation.

Figure 5B:
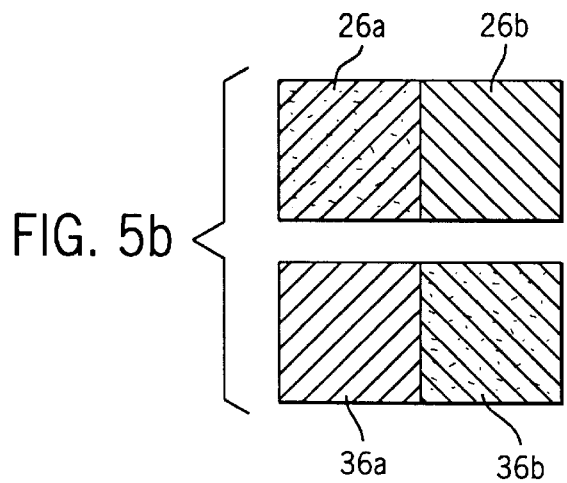
FIG. 5b is a cross-sectional view similar to FIG. 5a, albeit th the rotor and stator laminates in a second position.

Referring also to FIG. 5*b*, when current is provided to stator windings 20, the resulting stator and rotor magnetic fields interact and attract such that magnetic laminates 26*a* and 36*a* attract. If enough current is passed through windings 20, the fields are strong enough to overcome the force of spring 66, rotor core 28 is forced axially into alignment with stator core 18 and shoe 70 is removed from drum 68 thereby allowing rotor core 28 to rotate within stator core 18. When current is eliminated, spring 66 once again uncoils forcing shoe 70 into drum 68 thereby impeding rotor movement.

4. Interleaved Laminates For Optimized Manufacture

As indicated above, magnetic permeability and core loss properties of a material are developed in steel by manufacturing processes potentially at both the steel mill and core manufacturer's plant. As with all processes, there are process variations which result in variability of these developed properties. Traditionally, motor designers have been forced to design machines so as to take into account worst case conditions such as maximum allowable core loss and minimum allowable permeability required for specific applications.

According to a fifth embodiment to the present invention, laminates having all different types of properties can be combined in an interleaving fashion to achieve desired core operating characteristics. For example, if a base lamination stock is performing at a relatively poor end of a tolerance range, interleaving a high quality lamination set with the base lamination stock can bring the average core performance up to a desired level. Conversely, if a base lamination stock is performing very well, cores may be assembled by interleaving laminations of a poorer quality which have a lower cost. This construction technique results in the ability of designer to design machines to a nominal or high end of a material's performance range while keeping material costs at a minimum.

To this end, referring again to FIG. 2, according to this fifth embodiment, the rotor core 28 includes a first plurality of laminations 36*a* and a second plurality of laminations 36*b* which are interleaved to form core 28. While laminations 36*a* might have high permeability and low core loss, laminations 36*b* might have relatively lower permeability and higher core loss. By combining pluralities 36a and 36b which have different permeabilities and core losses in the proper ratio, a core designer can achieve virtually any core performance requirements within a range of achievable requirements.

5. Interleaving For Thermal Capability.

Referring again to FIG. 2, according to a sixth embodiment of the invention, core 28 includes a first plurality of laminations 36a and a second plurality of laminations 36b which have different thermal conductivity properties. For example, laminates 36a may be more thermally conductive than laminates 36b.

In many electrical machines a primary thermal path that moves heat out of the machine is thermal conductivity through the back iron of the machine. Many low core loss electrical steels include silicon or other elements which decrease the thermal conductivity of the material. By interleaving a low carbon steel lamination set 36a with a silicon steel lamination set 36b it is possible to gain electrical performance benefits of silicon steel while providing thermal conduits made of higher thermal conductivity carbon steel for removing heat from the machine. This results in a more cost-effective thermally efficient design.

C. Other Embodiments.

It should be understood that the apparatuses described above are only exemplary and do not limit the scope of the invention, and that various modifications could be made by those skilled in the art that would fall under the scope of the invention. For example, while the invention is described in the context of an induction motor, clearly the invention is applicable to other types of electromagnetic machines including alternators, generators, synchronous AC and DC machines, etc. In addition, while each of the embodiments described above includes first and second pluralities of laminates 36a, 36b, respectively, which are interleaved such that each laminate is adjacent laminates from the opposite plurality, clearly, other configurations including more laminates from the first plurality 36a or fewer laminates from the first plurality 36a than from the second plurality 36b could be configured. For example, every third laminate within rotor core 28 might be a mechanical strengthening laminate or a relatively high thermal conductivity carbon steel laminate.

Moreover, while each of laminates 36 and 26 are illustrated as having the same thickness, clearly, certain of the laminates may be thinner than others. This is particularly true with respect to the laminates illustrated and described with reference to FIGS. 5a and 5b. For example, nonmagnetic laminates 26b and 36b may have greater thickness than laminates 26a and 36a. This type of gradient interleaving can be used to increase the axial length of travel of the rotor core 28 within the stator core 18. A periodic interleaved construction produces an axial travel equal to the axial thickness of the nonmagnetic lamination packets 26b and 36b. By interleaving lamination packets of varying axial thickness it is possible to maintain radial misalignment between rotor steel and stator steel over a much greater axial distance.

Furthermore, while several different embodiments of the present invention have been described above, clearly, several different types of laminates from each of the above-mentioned embodiments could be combined to provide rotor and stator cores 28, 18, respectively, which have various different characteristics. For example, some highly thermally conductive laminates could be provided with some strength laminates which could also be combined with high permeability and low core loss laminates to further define core characteristics.

To apprise the public of the scope of this invention, we make the following claims:

What is claimed is:

1. A laminated configuration for use with an electromagnetic machine, the configuration including:
   a first plurality of lamenents, each lamenent in the first plurality including a flat magnetic member;
       a second plurality of lamenents, each lamenent in the second plurality including a flat nonmagnetic member;
       a rotor core formed from the first and second lamenent sets interleaved such that a first magnetic pattern is formed along a length of the rotor core, the pattern including magnetic sections and nonmagnetic sections;
   third and fourth pluralities of lamenents, the third plurality including magnetic lamenents and the fourth plurality including nonmagnetic lamenents, wherein, when the third and fourth pluralities of lamenents are secured together to form a stator core, the third and fourth pluralities are interleaved such that a second magnetic pattern is formed along the length of the stator core, the second pattern essentially identical to the first pattern;
   an axle; and
   a spring; and
   wherein the rotor includes a rotor winding and the stator includes a stator winding, the rotor mounted on the axle for rotation within the stator core, the axle allowing rotor movement there along axially between a first position and a second position, wherein, in the first position, the first pattern is essentially aligned with the second pattern and, in the second position, the first and second patterns are misaligned, the spring biasing the rotor toward the second position, when current is supplied to the stator winding, a field generated thereby forces the rotor against the force of the spring into the first position.

* * * * *